April 21, 1925.

J. W. McGEE

LAWN SPRINKLER

Filed Jan. 3, 1922

1,534,979

Joseph W. McGee,
INVENTOR

BY Victor J. Evans
ATTORNEY

WITNESS:

Patented Apr. 21, 1925.

1,534,979

UNITED STATES PATENT OFFICE.

JOSEPH WHITE McGEE, OF MANTUA, NEW JERSEY, ASSIGNOR TO MALCOLM C. LUDLAM, OF WOODBURY, NEW JERSEY.

LAWN SPRINKLER.

Application filed January 3, 1922. Serial No. 526,782.

*To all whom it may concern:*

Be it known that I, JOSEPH W. McGEE, a citizen of the United States, residing at Mantua, in the county of Gloucester and State of New Jersey, have invented new and useful Improvements in Lawn Sprinklers, of which the following is a specification.

My invention relates to a novel lawn sprinkler wherein the distributing member for the water is automatically oscillated by the force of the water supplied thereto. A further object of my invention is to provide a novel lawn sprinkler of this character wherein the distributing member for the water is loosely journaled to oscillate in the water motor casing while means actuated from the water wheel of the motor and in operative connection with the distributing member causes the oscillation of said distributing member in the operation of the sprinkler. A still further object of my invention is to provide a lawn sprinkler of this character consisting of a water motor, having an inlet and an outlet, said outlet arranged in the upper portion of the motor casing and in communication with a port in a distributing member adapted to oscillate in said casing, a rocker arm and link connection in operative connection between said distributing member and the water motor to automatically oscillate said distributing member, the inlet of the water motor leading to a hose coupling for supply of water to said motor, and a penetrating member on the lower extremity of the device adapted to be implanted in the ground to hold the device in a stationary vertical position.

Further more the pipe forming the distributing member is curved to effect varying angularlity for the sprinkling nozzles carried by said pipe thereby effecting means for sprinkling a wide area of lawn.

In the further disclosure of the invention reference is to be had to the accompanying sheet of explanatory drawings constituting a part of this specification and in which like characters of reference designate the same or corresponding parts in all the views.

Figure 1:
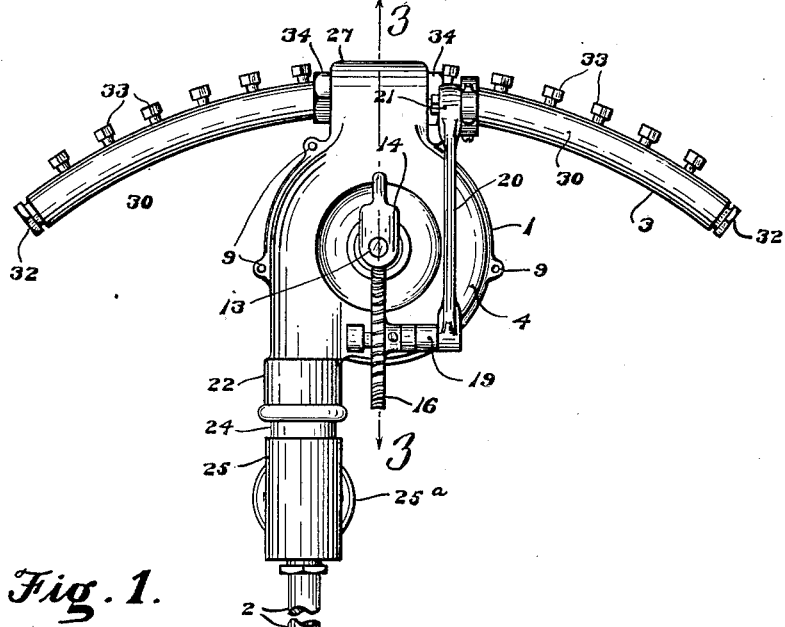
Figure 1 is an elevational view showing an embodiment of my novel lawn sprinkler.
Figure 2:
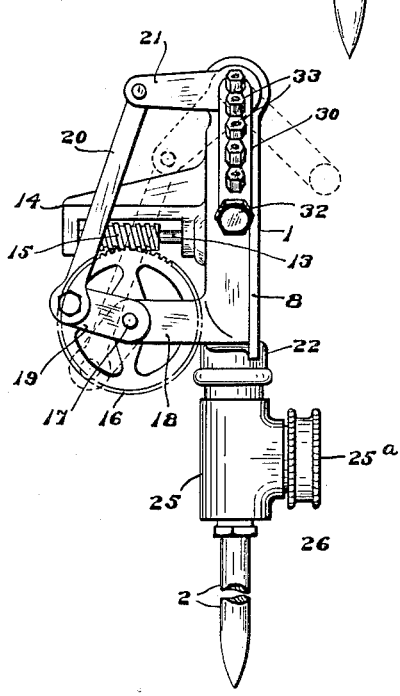
Figure 2 is an end view taken looking on the right hand side of Figure 1.
Figure 3:
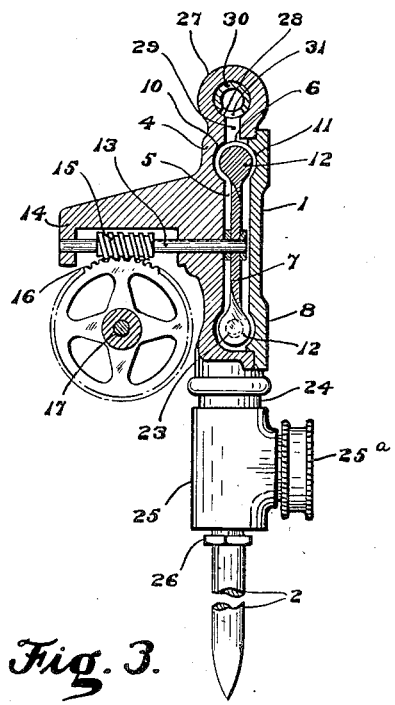
Figure 3 is a vertical section partly in elevation taken on the line 3—3 in Figure 1.

My invention resides in providing a water motor or turbine 1 adapted to be supported vertically from the ground in a fixed position by a penetrating member 2 carried by the motor at its lower extremity. The uppermost portion of the motor carries an oscillating distributing member 3 adapted to be oscillated laterally in relation to the motor by unique means driven by the force of the water supplied to the motor, the said water being discharged from the motor to the distributing member to sprinkle the lawn. The water motor 1 consists of the casing 4 having a cylindrical chamber 5, one wall of the casing 4 having a circular opening 6, for the reception of water wheel 7 in the chamber 5 to close this circular opening 6 a shouldered cap plate 8 is provided and is secured to the casing 4 by any suitable fastening means such as tap bolts 9. The opposed and spaced apart faces of the casing 4 and the cap plate 8 forming the chamber 5 have the annular concave grooves 10 and 11 located directly opposite each other. The water wheel 7 consists of a plurality of vanes or paddles 12 circular in a transverse plane to substantially conform to the concave grooves 10 and 11 to effect a most efficient utilization of the water, to turn the water wheel. The water wheel 7 is securely mounted on a shaft 13 journaled in the casing 4, the free end of the shaft is journaled in a bracket 14 integral with the casing 4, on this shaft is secured a worm 15 in driving connection with a worm wheel 16 securedly mounted on a shaft 17 journaled in a bracket 18 integral with the casing 4. On this shaft 17 is secured a rocker arm 19 to the free end of which is pivotally attached a link 20, the other end of said link being pivotally attached to the free end of a rocker arm 21 secured to the distributing member 3.

The casing 4 has a tangential enlargement 22 depending therefrom and has extending therethrough and communicating with the chamber 5 an inlet port 23 for the supply of water into the chamber 5 to operate the water wheel 7. 24 designates a nipple threaded into the enlargement 22, said nipple threading into a tee 25 which is provided with a hose coupling 25ᵃ for attachment to a hose or other suitable water supply. The lowermost outlet of the tee is capped by the plug 26 which carries the pointed penetrating member 2 adapted to be forced into the ground to hold the device in a vertical fixed position. The uppermost portion of the casing 4 is enlarged as at 27, said enlargement having a circular opening 28 extending therethrough, said opening being in communication with the chamber 5 through a discharge opening 29. The distributing member 3 consists of a pipe 30 journaled in the opening 28, said pipe 30 having an opening 31 adapted to communicate at all times in the oscillation of the pipe with the port 29 for the supply of water to the distributing member 3.

The ends of the pipe 30 are capped by the removable screw plugs 32 to allow for cleansing of the pipe at various times. Each portion of the pipe 30 extending beyond the enlargement is bent downward to give curvature to the pipe, along the upper portion of the pipe are arranged a plurality of discharge nozzles 33, the curvature of the pipe varying the angularity of the said nozzles to allow of the sprinkling of a wide area of lawn. To hold the pipe against longitudinal movement in respect to the casing 4, collars or nuts 34 are carried on the pipe and adapted to engage against the opposite faces of the enlargement 27. In the operation of my novel lawn sprinkler the ordinary water supply hose is connected to the coupling 25ª, the water passing through the tee 25 and the nipple 24, thence through the port 23 into the chamber 5 and against the vanes 12 to turn the water wheel 7, the water is then discharged through the port 29 of the casing 4 into the port 31 of the pipe and is finally discharged through the nozzles 33 carried by the pipe 30. It will be readily seen that the curvature of the pipe 30 will vary the angular relation between the nozzles in respect to the surface of the lawn on which the device is supported, thereby effecting means for sprinking a considerable area of lawn.

The oscillation of the pipe 30 in the operation of the device is effected by the rocker arm 19 and link connection 20 the power therefor being supplied by the turning of the water wheel 7 by the supply water into the water pump or turbine 1, the unique arrangement of the mechanism for accomplishing this result providing automatic means for oscillating said pipe 30 to completely sprinkle the entire area of the lawn.

Whilst there has been shown and described one preferred embodiment of this invention, it will of course be understood that the same is susceptible of detail changes and the right is hereby reserved to make such structural variations as fairly lie within the scope of the appended claim.

Having described my invention, what I claim as new and desire to secure by Letters Patent is:—

A lawn sprinkler of the character described comprising a casing, a water wheel carried by said casing and rotatable about a horizontal axis, an arcuate nozzle rockably carried by said casing and adapted to receive water discharged from said water wheel, said nozzle mounted for rocking movement about an axis transversely of the axis of the water wheel, a tee-coupling connected to said casing and having a horizontal water inlet therein, a sharpened supporting pin depending from said tee-coupling for supporting said lawn sprinkler in an upright position, and means operable by rotation of said water wheel for rocking said nozzle.

In testimony whereof I affix my signature.

JOSEPH WHITE McGEE.